Oct. 19, 1965
W. E. AULABAUGH ETAL
3,212,250
TREE LIMB SHAKER ATTACHMENT FOR CHAIN SAWS
Filed June 26, 1964
2 Sheets-Sheet 1
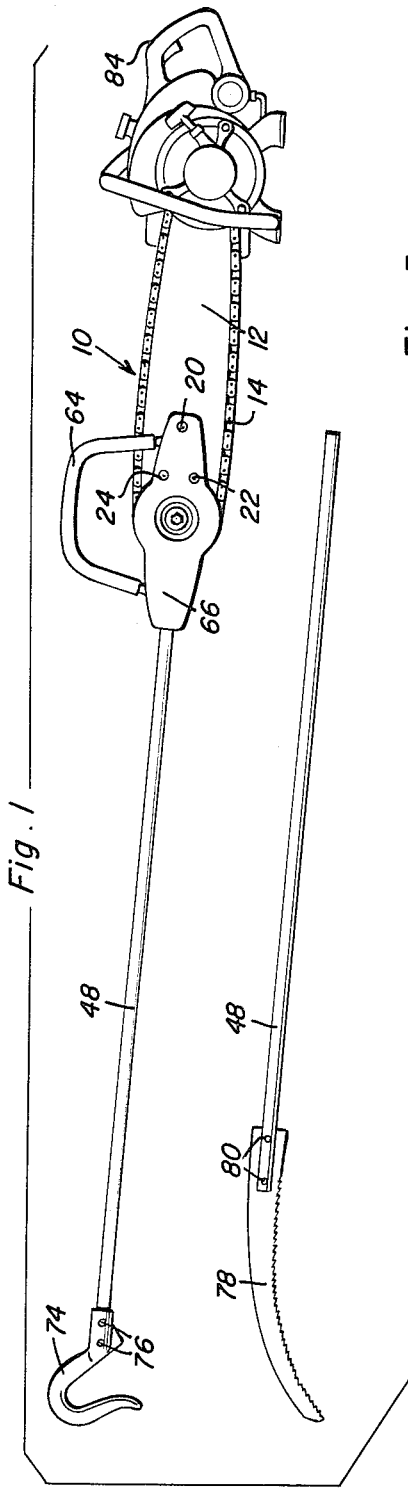
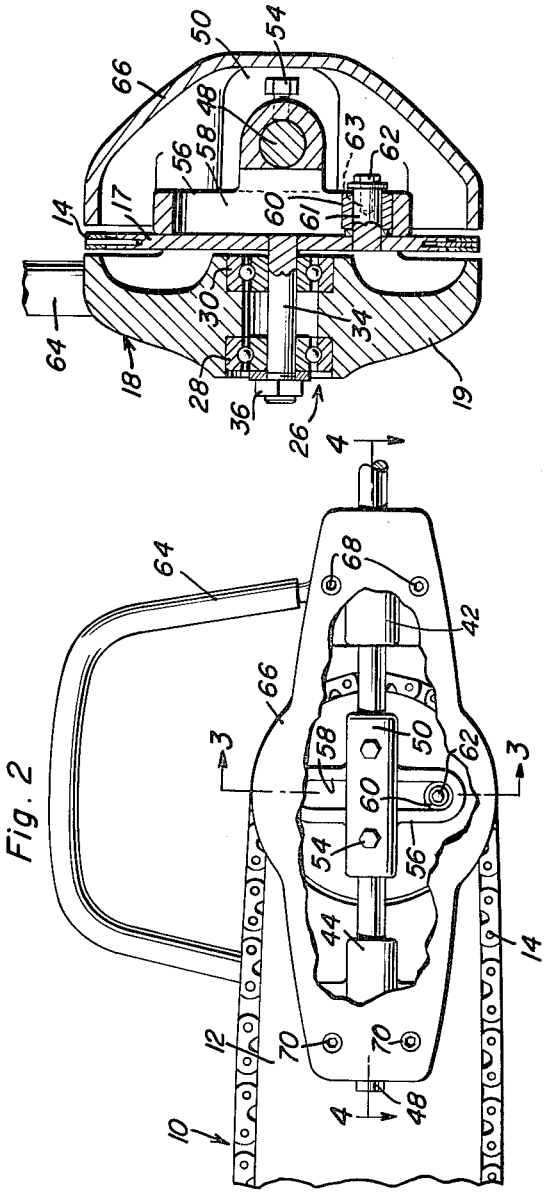
William E. Aulabaugh
John E. Aulabaugh
INVENTORS
BY *James A. O'Brien*
and *Harvey B. Jacobson*
Attorneys

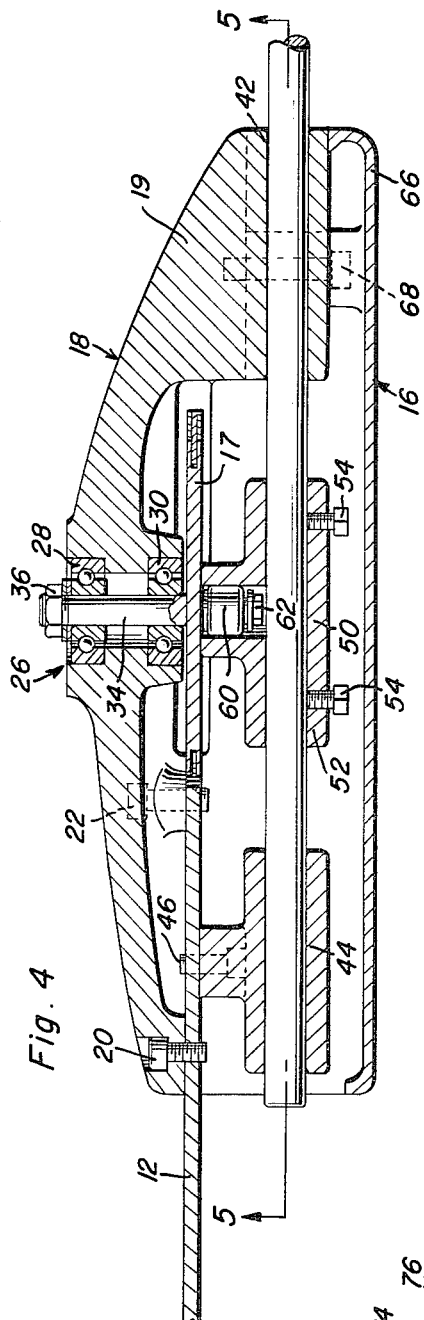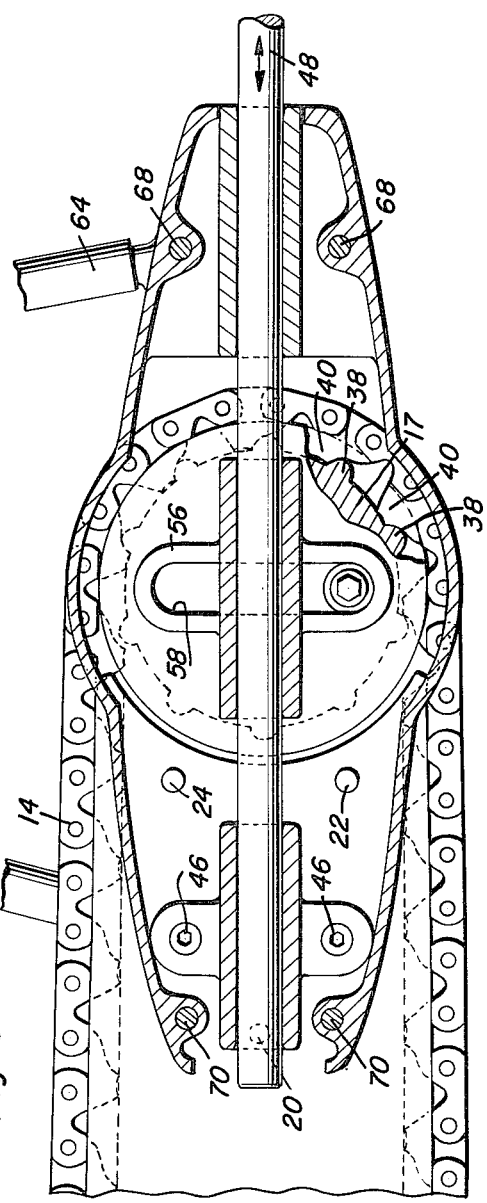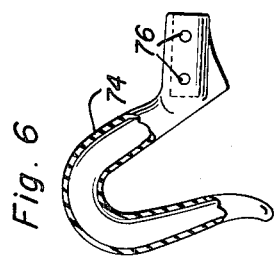

United States Patent Office 3,212,250
Patented Oct. 19, 1965

3,212,250
TREE LIMB SHAKER ATTACHMENT FOR CHAIN SAWS
William E. Aulabaugh, P.O. Box 72, Los Molinos, Calif., and John E. Aulabaugh, Box 91, Vina, Calif.
Filed June 26, 1964, Ser. No. 378,212
4 Claims. (Cl. 56—328)

This invention relates to a novel and useful attachment for chain saws of the type including a chain guide bar adapted to rotatably support a chain driven nose guide wheel at its free end.

The attachment of the instant invention includes an elongated arm and means supported from the guide bar of a chain saw for mounting one end of the elongated arm on the chain guide bar for longitudinal reciprocation along a path generally paralleling the guide bar with the other end of the arm projecting forwardly of the free end of the guide bar. Means is provided for drivingly connecting the chain driven nose guide wheel of the chain guide bar to the elongated arm for reciprocating the latter in direct response to rotation of the guide wheel. The free end of the arm may have a saw blade or the like secured thereto whereupon the chain saw and the attachment of the instant invention may be utilized to carry out pruning operations. In addition, instead of a saw blade being secured to the free end of the arm of the attachment, a hook-like member may be secured to the arm and utilized as a means for shaking a tree limb engaged in the hook member.

The main object of this invention is to provide an attachment for a chain saw including means by which the chain saw may be utilized as a tree limb shaker or as motive force for driving a reciprocating elongated pruning saw blade.

Another object of this invention, in accordance with the immediately preceding object, is to provide an attachment constructed in a manner so as to be readily adapted for securement to substantially all types of chain saws of the type including a guide bar adapted to rotatably support a chain driven nose guide wheel.

Still another object of this invention is to provide a chain saw attachment in accordance with the preceding objects and which may be readily secured to existing but slightly modified chain saw guide bars.

A further object of this invention is to provide an attachment for a chain saw including means for supporting a work-engaging tool and for rapidly reciprocating the work-engaging tool in direct response to rotation of the chain driven nose guide wheel of the chain saw.

A final object of this invention to be specifically enumerated herein is to provide a tree limb shaker attachment for chain saws which will conform to conventional forms of manufacture, be of simple construction and easy to use so as to provide a device that will be economically fesible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a conventional form of chain saw shown with the attachment of the instant invention operatively mounted thereon and an alternate work-engaging arm supporting an elongated pruning saw blade;

FIGURE 2 is an enlarged side elevational view of the portion of the chain saw to which the attachment of the instant invention is secured with parts of the chain saw and attachment being broken away and shown in section;

FIGURE 3 is an enlarged transverse vertical sectional view taken substantially upon the plane indicated by the section line 3—3 of FIGURE 2;

FIGURE 4 is an enlarged horizontal sectional view taken substantially upon the plane indicated by the section line 4—4 of FIGURE 2;

FIGURE 5 is a vertical sectional view taken substantially upon the plane indicated by the section line 5—5 of FIGURE 4; and FIGURE 6 is an enlarged side elevational view of the tree limb shaking hook of the attachment with portions of the hook being broken away and shown in section.

Referring now more specifically to the drawings, the numeral 10 generally designates a conventional form of gasoline powered chain saw which includes a chain guide bar 12 and is adapted to rotatably journal a nose guide wheel at its free end with the saw chain 14 of the saw 10 drivingly engaged with the nose guide wheel for effecting its rotation in response to movement of the chain saw blade 14.

The attachment of the instant invention is generally referred to by the reference numeral 16 and includes a replacement nose guide wheel 17 which is journaled from the free end of the guide bar 12. The chain 14 is of conventional design excepting that it does not include wood cutting teeth and also comprises a portion of the attachment 16 and is utilized to drive the latter in lieu of the conventional toothed saw chain.

A mounting bracket or housing generally referred to by the reference numeral 18 is provided and includes a first half 19 secured to the guide bar 12 by means of suitable fasteners 20, 22 and 24. The mounting bracket or housing 18 includes a journal portion generally referred to by the reference numeral 26 and which includes a pair of bearings 28 and 30. The guide wheel 17 includes a stub axle 34 secured through the journal portion 26 by means of a threaded fastener 36. The stub axle 34 is rotatably journaled on the journal portion 26 and it will be noted that the axes of rotation of the guide wheel 17 and stub axle 34 coincide. The guide wheel 17 includes radially outwardly projecting lugs 38 which are drivingly engaged by the longitudinally spaced teeth 40 of the chain 14 and it may therefore be seen that the chain 14 drives the guide wheel 17.

The mounting bracket 18 includes a first sleeve or journal 42 disposed on the side of the guide bar remote from the journal portion 26 and also a second sleeve or journal portion 44 which is axially aligned with the journal portion 42 and secured to the guide bar 12 by means of suitable fasteners 46.

An elongated arm 48 is reciprocal through the journals 42 and 44 and is spaced outwardly of the side of the guide bar 12 remote from the journal portion 26. A fitting 50 defining a tubular member having a bore 52 formed longitudinally therethrough is disposed on the arm 48 and secured in adjusted position longitudinally thereof by means of a pair of setscrews 54. The fitting 50 includes a frame 56 defining a slot 58 disposed normal to the axis of rotation of the guide wheel 17. Further, it may be seen that a roller 60 is journaled on a crankpin 61 eccentrically mounted on the guide wheel 17 and retained on the crankpin 61 by means of a suitable fastener 62. Further, the roller 60 is rollingly received in the slot 58. Thus, it is to be noted that rotation of the guide wheel 17 will effect reciprocation of the roller 60 in the slot 58 and therefore reciprocation of the arm 48.

A bail-type handle 64 is supported from the portion of the mounting bracket 18 or housing disposed on the side of the guide bar 12 remote from the journals 42 and 44 and may be grasped by a workman operating the saw 10. Still further, the housing 18 include a second half 66 secured to the guide bar 12 and the first half 19 by means of suitable fasteners 68 and 70. The second half 66 opens toward the guide bar 12 and encloses the journals 42 and 44 as well as the fitting 50 and the roller 60.

The free end of the arm 48 has a hook member 74 secured thereto by means of fasteners 76 and the hook member is adapted to engage a tree limb and to shake the latter upon operation of the chain saw 10. In addition, it may be seen from FIGURE 1 of the drawings that a pruning saw blade 78 may be secured to the free end of the arm 48 in lieu of the hook member 74 and that the free end of the arm member 48 is bifurcated so as to receive the saw blade 78 between the furcations thereof, the saw blade 78 being secured between the furcations of the free end of the arm 48 by means of fasteners 80 similar to the fasteners 76.

As can best be seen from FIGURE 3 of the drawings the roller 60 is rotatably journaled on a crankpin 61 having a blind bore 63 formed therein in which the fastener 62 is secured.

In operation, the chain saw 10 is operated in the usual manner with one hand of the workman grabbing the usual handle portion 84 of the chain saw and the other hand engaging the bailtype handle 64 of the attachment 16. Thus, it may be seen that the attachment 16 may be utilized to effectively reciprocate any suitable work tool supported from the free end of the arm 48 and that the chain saw 10 may be readily converted back to its original form for cutting wood merely by the removal of the attachment 16 and the replacement of a conventional guide wheel and saw chain thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a chain saw of the type including a chain guide bar rotatably supporting a chain driven nose guide wheel at its free end, an elongated housing extending longitudinally of the free end of said bar and defining a pair of housing halves embracing the receiving the free end of said bar and also said guide wheel therebetween and rigidly secured to said bar at one pair of corresponding ends and projecting beyond said free end and rigidly secured together at the other pair of ends, a pair of axially spaced and aligned bearings supported within opposite ends of said housing, on opposite sides of the axis of rotation of said nose wheel and on one side of said bar, a drive shaft reciprocably supported from said bearings, said bearings being fixed in position relative to said bar and said housing, said nose wheel including a stub axle projecting outwardly of the other side of said bar, bearing means carried by the corresponding housing half and journaling said stub axle, a guide carried by said shaft between said bearings and including means defining a slot perpendicular to said drive shaft and said axis, and crankpin means eccentrically mounted on said guide wheel and projecting outwardly of said one side of said bar and slidably receive in said slot for reciprocating said drive shaft in response to rotation of said nose guide wheel.

2. The combination of claim 1 wherein said drive shaft projects outwardly of said other pair of ends of said housing halves and has a hooked end portion thereon adapted to engage a tree limb to be shaken.

3. The combination of claim 1 including means removably securing said other pair of ends of said housing halves together and removably securing said one pair of ends of said housing halves to opposite sides of said guide bar.

4. The combination of claim 1 wherein said guide includes means adjustably mounting said guide on said drive shaft for adjustment longitudinally of the latter.

References Cited by the Examiner

UNITED STATES PATENTS

| | | | |
|---|---|---|---|
| 2,542,665 | 2/51 | Gustafson | 56—328 |
| 2,708,468 | 5/55 | Lantz | 143—32—13 X |
| 2,713,271 | 7/55 | Dodegge | 143—68—6 X |
| 2,790,292 | 4/57 | Trecker | 56—25 |
| 2,821,216 | 1/58 | West et al. | 143—32—14 X |
| 2,881,519 | 4/59 | Gardner | 143—68—5 X |
| 3,013,374 | 12/61 | Balsbaugh | 56—328 |
| 3,073,073 | 1/63 | Van Pelt | 143—32—14 |
| 3,174,269 | 3/65 | Londo | 56—328 |

FOREIGN PATENTS

| | | |
|---|---|---|
| 1,124,672 | 7/56 | France. |

ABRAHAM G. STONE, *Primary Examiner.*
RUSSELL R. KINSEY, *Examiner.*